United States Patent
Kouma et al.

(10) Patent No.: US 6,881,649 B2
(45) Date of Patent: Apr. 19, 2005

(54) METHOD OF MAKING DEVICE CHIPS COLLECTIVELY FROM COMMON MATERIAL SUBSTRATE

(75) Inventors: Norinao Kouma, Kawasaki (JP); Yoshihiro Mizuno, Kawasaki (JP); Hisao Okuda, Kawasaki (JP); Ippei Sawaki, Kawasaki (JP); Osamu Tsuboi, Kawasaki (JP); Yoshitaka Nakamura, Suzaka (JP)

(73) Assignees: Fujitsu Limited, Kawasaki (JP); Fujitsu Media Devices Limited, Nagano (JP)

( * ) Notice: Subject to any disclaimer, the term of this patent is extended or adjusted under 35 U.S.C. 154(b) by 268 days.

(21) Appl. No.: 10/352,001

(22) Filed: Jan. 28, 2003

(65) Prior Publication Data

US 2004/0014300 A1 Jan. 22, 2004

(30) Foreign Application Priority Data

Jul. 18, 2002  (JP) ........................................ 2002-210197

(51) Int. Cl.[7] ........................ H01L 21/301; H01L 21/46; H01L 21/78
(52) U.S. Cl. ........................ 438/460; 438/68; 438/458; 438/753; 359/900
(58) Field of Search ................................ 438/460–465, 438/68, 455, 458

(56) References Cited

U.S. PATENT DOCUMENTS

| 4,237,600 | A | * | 12/1980 | Rosen et al. ................ 438/109 |
|---|---|---|---|---|
| 5,017,243 | A | * | 5/1991 | Otsubo ........................ 136/244 |
| 5,418,799 | A | | 5/1995 | Tada |
| 5,520,297 | A | * | 5/1996 | Kagami et al. ................ 216/12 |
| 5,719,073 | A | * | 2/1998 | Shaw et al. ................... 438/53 |
| 6,232,861 | B1 | * | 5/2001 | Asada ......................... 335/222 |
| 6,388,789 | B1 | * | 5/2002 | Bernstein ..................... 359/198 |
| 6,544,863 | B1 | * | 4/2003 | Chong et al. ................ 438/455 |
| 6,593,677 | B1 | * | 7/2003 | Behin et al. ................. 310/309 |
| 6,628,041 | B1 | * | 9/2003 | Lee et al. .................... 310/309 |
| 6,695,457 | B1 | * | 2/2004 | van Drieenhuizen et al. .... 359/872 |
| 6,713,367 | B1 | * | 3/2004 | Solgaard et al. ............. 438/459 |
| 6,716,661 | B1 | * | 4/2004 | Zou et al. ..................... 438/49 |
| 6,723,659 | B1 | * | 4/2004 | Mizuno et al. .............. 438/753 |
| 6,822,776 | B1 | * | 11/2004 | Hah et al. .................... 359/224 |
| 2002/0159170 | A1 | * | 10/2002 | Tsuboi et al. ................ 359/872 |
| 2003/0071542 | A1 | * | 4/2003 | Satoh et al. ................. 310/367 |
| 2004/0141894 | A1 | * | 7/2004 | Mizuno et al. .............. 422/201 |

FOREIGN PATENT DOCUMENTS

| JP | 64-48423 | 2/1989 |
|---|---|---|
| JP | 3-293747 | 12/1991 |
| JP | 6-275714 | 9/1994 |

* cited by examiner

Primary Examiner—John F. Niebling
Assistant Examiner—Angel Roman
(74) Attorney, Agent, or Firm—Staas & Halsey LLP (57) ABSTRACT

A plurality of micromirror chips are collectively made from a common substrate. Each of the micromirror chips is formed with a micromirror unit including a frame, a mirror-forming portion separate from the frame via spaces, and torsion bars connecting the mirror-forming portion to the frame. The common substrate is subjected to etching to provide the spaces and make division grooves for dividing the common substrate into the individual micromirror chips. The etching for the spaces and the etching for the division grooves are performed in parallel with each other.

10 Claims, 12 Drawing Sheets

METHOD OF MAKING DEVICE CHIPS COLLECTIVELY FROM COMMON MATERIAL SUBSTRATE

BACKGROUND OF THE INVENTION

1. Field of the Invention

The present invention relates to a method of making collectively a plurality of device chips, in particular micromirror chips, from a single material substrate.

2. Description of the Related Art

Figure 12A:
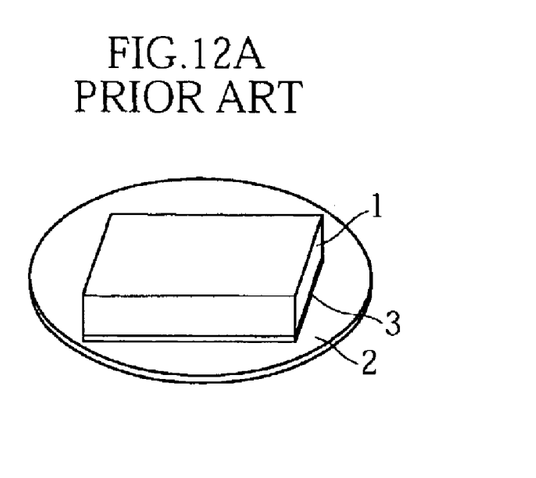
FIGS. 12A–12E show a conventional method of making semiconductor device chips from a common substrate.
Figure 12B:
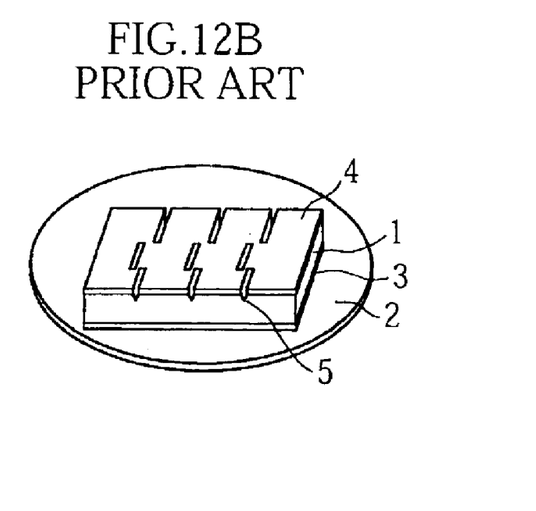
Figure 12C:
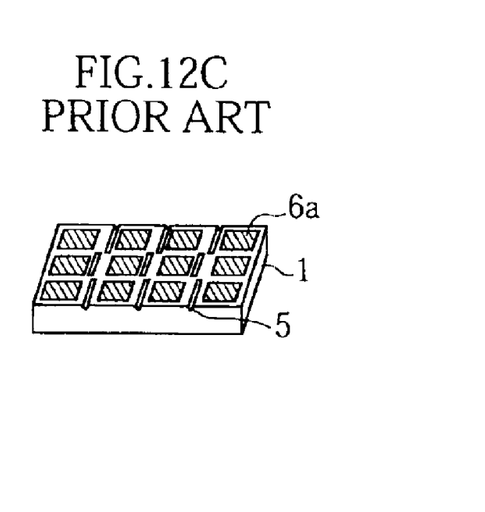
Figure 12D:
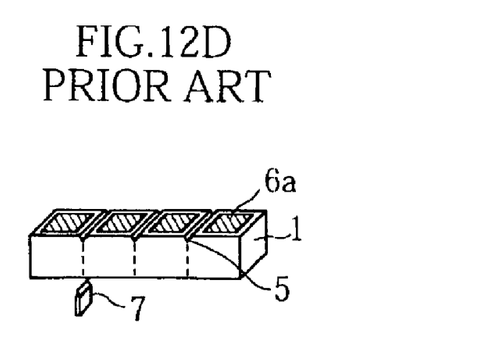
Figure 12E:
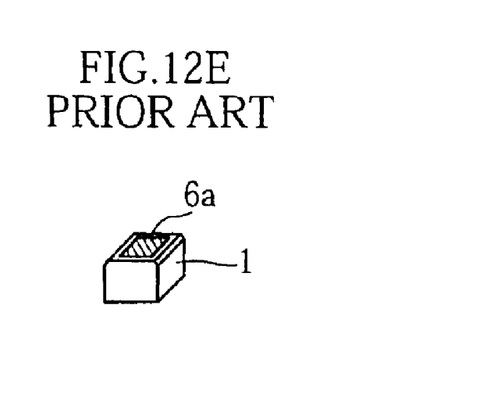

For achieving better production efficiency and lower cost, a plurality of identical devices (micromirror chips, semiconductor laser units, etc.) may be produced collectively from a single material substrate than produced individually from the corresponding number of material substrates. Japanese patent application-A-6(1994)-275714, for example, discloses a method by which several semiconductor laser units are formed in a single material substrate, the substrate being divided later into smaller pieces to provide the end products. FIGS. 12A–12E of the accompanying drawings illustrate the principal steps of the above-mentioned conventional method. In accordance with it, a prescribed number of semiconductor laser units are formed in a common material substrate 1. As shown in FIG. 12A, the substrate 1 is provisionally attached to a glass disk 2 by adhesive 3 and polished. Then, as shown in FIG. 12B, a resist layer 4 is formed to cover the upper surface of the substrate 1, and grooves 5 are formed in the resist layer 4 by etching. As shown in FIG. 12C, electrodes 6a are formed on the substrate 1 for the respective semiconductor laser units. Finally, as shown in FIG. 12D, the substrate 1 is divided at positions corresponding to the division-facilitating grooves 5. Thus, individual semiconductor laser units as shown in FIG. 12E are obtained.

By the conventional method, the division-facilitating grooves 5 are formed after the basic structure of the laser units has been built in the material substrate 1. Unfavorably, such a procedure impairs the production efficiency due to the extra step of forming the grooves.

SUMMARY OF THE INVENTION

The present invention has been proposed under the circumstances described above. It is, therefore, an object of the present invention to provide a method of making a plurality of device chips, in particular micromirror chips, from a single material substrate with higher production efficiency and lower production cost than is conventionally possible.

According to a first aspect of the present invention, there is provided a method of making a plurality of micromirror chips collectively from a common substrate, each of the micromirror chips including a micromirror unit that is provided with a frame, a mirror-forming portion separate from the frame via spaces, and a torsion bar connecting the mirror-forming portion to the frame. The method comprises: etching the common substrate to form the above-mentioned spaces; and etching the common substrate to form division grooves for dividing the common substrate into the micromirror chips. The etching for formation of the spaces is performed in parallel with the etching for formation of the division grooves. In this manner, the production efficiency is greatly improved since there is no need to perform two independent etching processes for the space formation and the division groove formation. Further, the elimination of an etching process can reduce the possibility of breakage of the rather fragile micromirror chips during the production procedure.

The common substrate may be made of silicon, for example. For providing electrical conductivity, the silicon substrate may be doped with appropriate p-type or n-type impurities. Each of the micromirror chips divided from the common substrate may contain at least one micromirror device. For better production efficiency, each micromirror chip may contain a plurality of (e.g., eighty) micromirror devices arranged in an array.

According to the present invention, the etching for forming the spaces between the frame and the mirror-forming portion and the etching for the division grooves may be dry or wet etching. Preferably, DRIE (Deep Reactive Ion Etching) with the use of $SF_6$ gas and $C_4F_8$ gas may be employed for precise and fine etching results.

Preferably, a reinforcing part connecting corners of micromirror chips may be formed while the etching for formation of the division grooves is performed. The reinforcing part may be produced by leaving part of the common substrate unetched.

With such a reinforcing part provided, it is possible to prevent the common substrate from being prematurely divided along the division grooves due to the stress concentration at the corners of the micromirror chips. The reinforcing part may have a thickness of 10 $\mu$m, for example, so that it can be easily removed when no longer required.

Preferably, the reinforcing part may be formed in parallel with the torsion bar.

Preferably, the division grooves may comprise a first groove and a second groove terminating at a point on the first groove. This arrangement is advantageous to enabling the first groove to serve as a bulwark against a break growing along the second groove.

Preferably, the division grooves may comprise closed loops separate from each other, each of the closed loops enclosing a corresponding one of the micromirror chips. Further, each of the closed loops may extend to be rectangular or nonrectangular (circular, for example). In this case, adjacent loops may be separated from each other by unetched part of the common substrate. Advantageously, even when a premature break occurs at a division groove, the break will fail to grow toward the adjacent division grooves thanks to the remaining part of the common substrate. As a result, the defect can be restricted to only one micromirror chip.

Preferably, the common substrate may comprise a composite plate including a first electroconductive layer, a second electroconductive layer and an intermediate insulating layer sandwiched by these electroconductive layers, wherein the division grooves and said spaces are formed in both the first and the second electroconductive layers. The electroconductive layers may be made of silicon doped with n-type or p-type impurities. The intermediate insulating layer may be made of silicon dioxide which can be obtained by oxidizing the surface of the electroconductive layers.

Preferably, the division grooves may extend to slant relative to the crystal axis of the common substrate.

According to a second aspect of the present invention, there is provided a method of making a plurality of device chips collectively from a common substrate. The method comprises: etching performed in a structure building process of the device chips; etching performed to form division grooves for dividing the common substrate into individual device chips; and forming a reinforcing part in the division grooves for connecting corners of the device chips. The etching in the structure building process of the device chips may be performed in parallel with the etching to form the division grooves. The reinforcing part may be formed by leaving part of the common substrate unetched.

Other features and advantages of the present invention will become apparent from the detailed description given below with reference to the accompanying drawings.

BRIEF DESCRIPTION OF THE DRAWINGS

FIGS. 10A–11B show other possible arrangements of division grooves formed in accordance with the present invention.

DETAILED DESCRIPTION OF THE PREFERRED EMBODIMENT

Preferred embodiments of the present invention will be described below with reference to the accompanying drawings.

Figure 1:
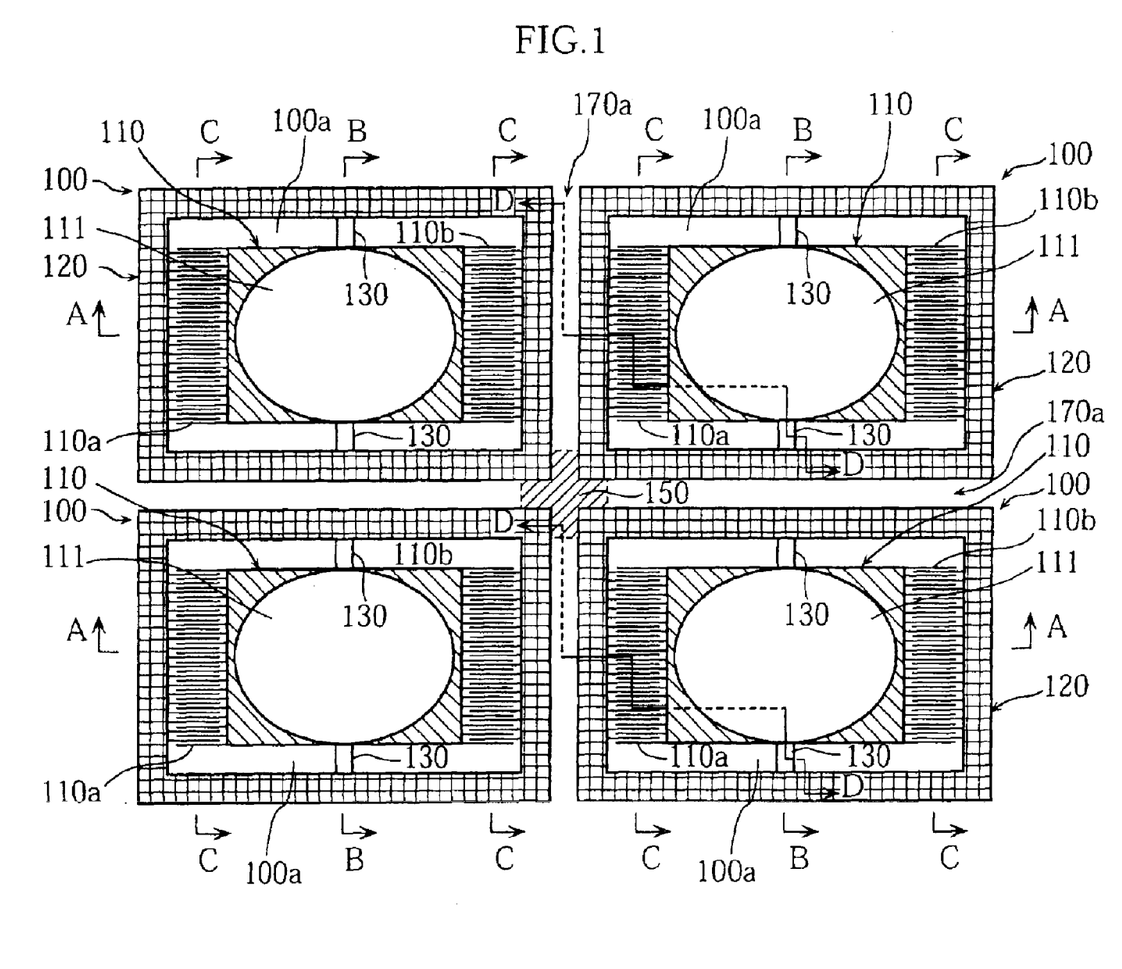
FIG. 1 is a plan view showing the upper side of micromirror chips produced by a method of the present invention.
Figure 2:
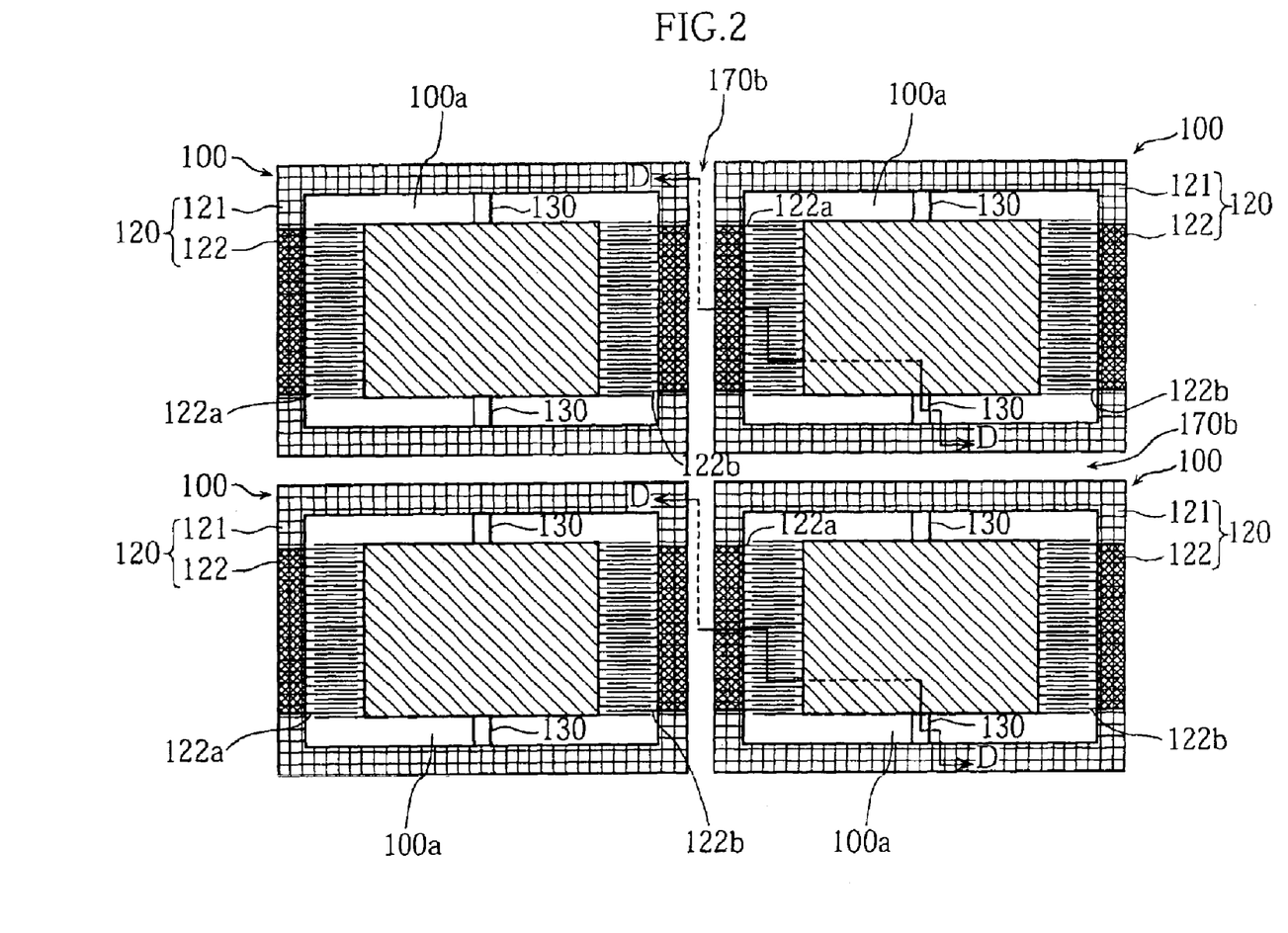
FIG. 2 is a bottom view showing the lower side of the micromirror chips of FIG. 1.
Figure 3A:
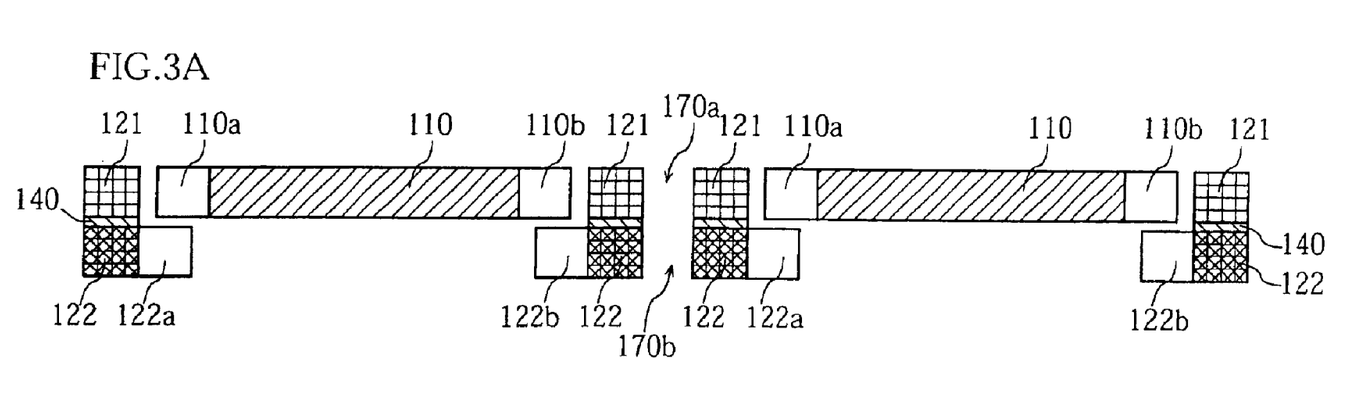
FIGS. 3A, 3B and 3C are sectional views taken along lines A—A, B—B and C—C in FIG. 1, respectively.
Figure 3B:
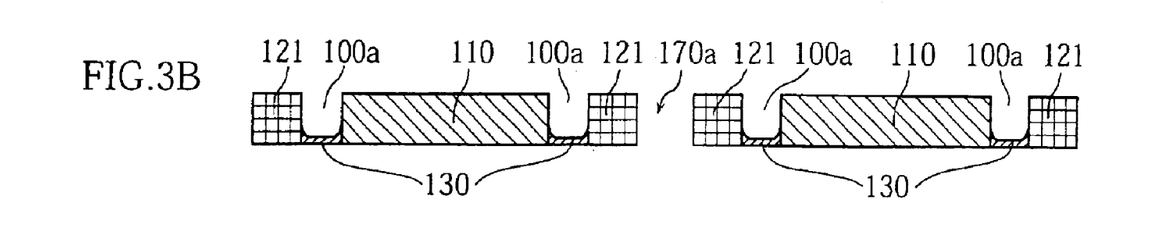
Figure 3C:
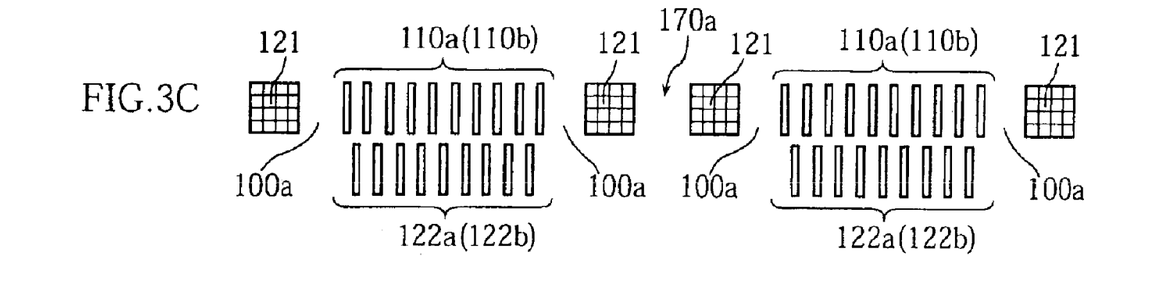

FIGS. 1–3 illustrate micromirror chips 100 (only four shown) according to a preferred embodiment of the present invention. Specifically, FIG. 1 is a plan view showing the upper side of the chips 100, while FIG. 2 is a bottom view showing the same chips 100. FIGS. 3A–3C are sectional views taken along lines A—A, B—B and C—C in FIG. 1, respectively. In the illustrated example, each micromirror chip 100 is depicted as consisting of a single micromirror element for clarity of illustration and description. According to the present invention, however, each micromirror chip 100 may include a plurality of micromirror elements (80 elements, for example) arranged in an array.

As shown in FIGS. 1 and 2, each micromirror chip 100 as a unit element is provided with a mirror portion 110, a frame surrounding the mirror portion 110, and a pair of torsion bars 130 connecting the mirror portion 110 and the frame 120. The mirror portion 110 and the frame 120 are connected to each other only by the paired torsion bars 130, and otherwise are separated by the vertically extending spaces 10a. With this arrangement, the mirror portion 110 can be twisted relative to the frame 120 about the axis of the torsion bars 130. All the parts of the micromirror chip 100 are formed integral from an electroconductive material, except for a mirror layer 111 and an insulating surface 140. The electroconductive material may be an n-type semiconductor obtained by doping Si (silicon) with P (phosphorus) or As (arsenic), or a p-type semiconductor obtained by doping Si with B (boron). Use may also be made of a metal such as W (tungsten) for the electroconductive material.

As shown in FIG. 1, the mirror portion 110 has its upper surface formed with a thin reflective layer (mirror layer) 111. Further, the mirror portion 110 is formed with first comb-like electrodes 110a, 110b at two opposing side surfaces.

As shown in FIGS. 2 and 3, the frame 120 has a multilayer structure consisting of a primary frame part 121, a pair of electrode bases 122 and an insulator 140 disposed between the primary frame part 121 and the electrode bases 122. The electrode bases 122 are integrally formed with second comb-like electrodes 122a, 122b extending inward of the frame. The second comb-like electrodes 122a, 122b are located immediately below the first comb-like electrodes 110a, 110b of the mirror portion 110. For avoiding interference in operation of the mirror portion 110, the first comb-like electrodes 110a, 110b are laterally offset from the second comb-like electrodes 122a, 122b (see FIG. 3C). As shown in FIG. 3B, the torsion bars 130 are smaller in thickness than the mirror portion 110 and connected to the primary frame part 121.

Referring now to FIGS. 4A–4H and 5A–5D, a method of making the micromirror chip 100 will be described below. Note that these figures are sectional views taken along the solid parts of D—D lines in FIG. 1.

Figure 4A:
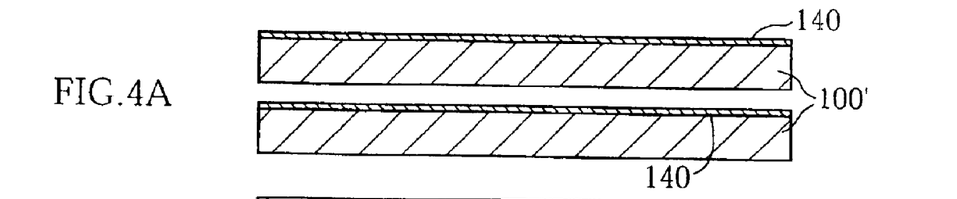
FIGS. 4A–4H and FIGS. 5A–5D illustrate the steps of the method of the present invention.

First, as shown in FIG. 4A, two silicon wafers 100' are prepared. These wafers are doped with an n-type or p-type impurity (As or B, for example) to be electroconductive. On each wafer 100', a silicon dioxide layer 140 is formed by thermal oxidation to a thickness of 500 nm, for example.

Figures 4B, 4C, 4D:
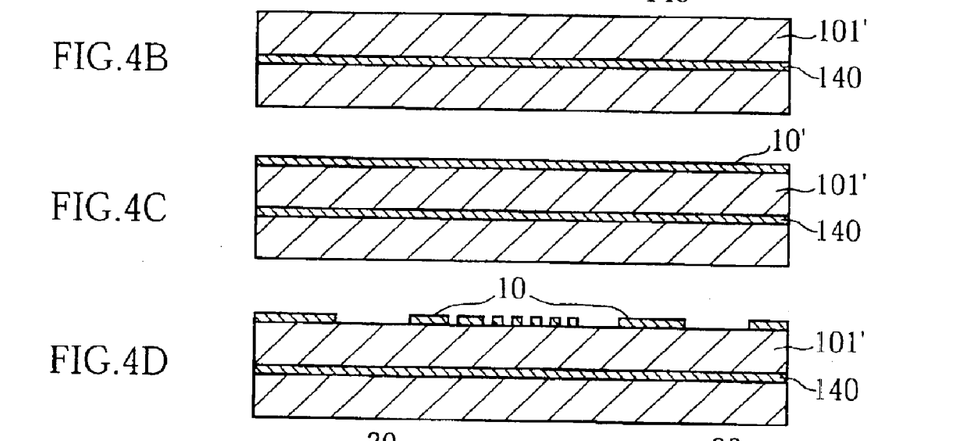
Figure 4E:
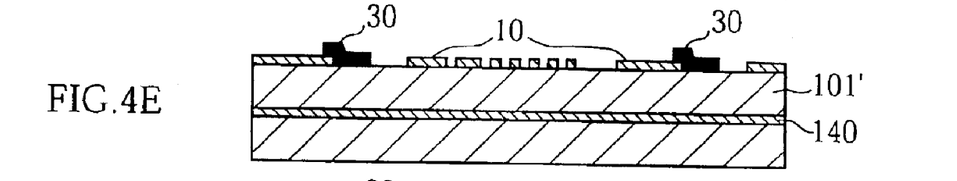

Then, as shown in FIG. 4B, the respective silicon dioxide layers 140 are brought into contact with each other, and annealed at about 100° C. under the atmosphere of nitrogen for fixation. Thereafter, the wafer surfaces are polished to provide an SOI wafer 101' (the thicknesses of the respective Si/SiO$_2$/Si layers may be 100 $\mu$m, 1 $\mu$m and 100 $\mu$m). The diameter of the SOI wafer 101' is 7.62 cm (3 inches). The attached silicon dioxide layers 140 serve as an intermediate insulator that electrically separates the doped silicon substrates from each other.

Then, as shown in FIG. 4C, the upper surface of the SOT wafer 101' is covered by a silicon oxide layer 10' (ranging in thickness from 100 nm to 1000 nm) that will be processed into a first etching mask. The silicon oxide layer 10' may be grown by thermal oxidation or CVD (chemical-vapor deposition), for example.

Figure 6:
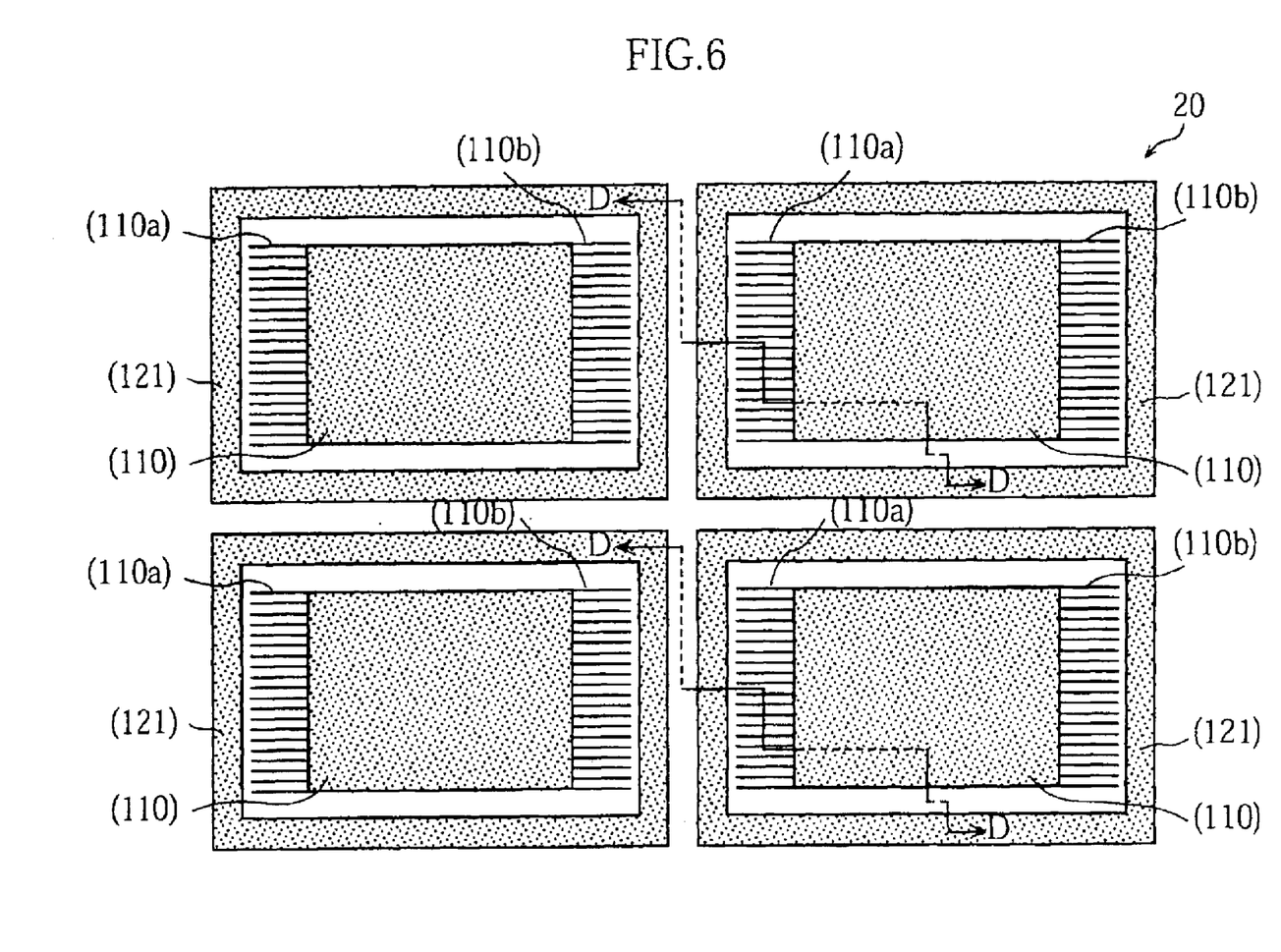
FIG. 6 shows a first mask used for the method of the present invention.

Then, as shown in FIG. 4D, the silicon oxide layer 10' is subjected to etching to form a first mask pattern 10. The etching is performed with the use of a first mask 20 shown in FIG. 6. The first mask 20 is configured so as to make the mirror portion 110, the first comb-like electrodes 110a, 110b and the primary frame part 121 of the micromirror chip 100. The etching may be wet etching with the use of a solution containing HF or dry etching with the use of CHF$_3$ gas or C$_4$F$_8$ gas.

Figure 7:
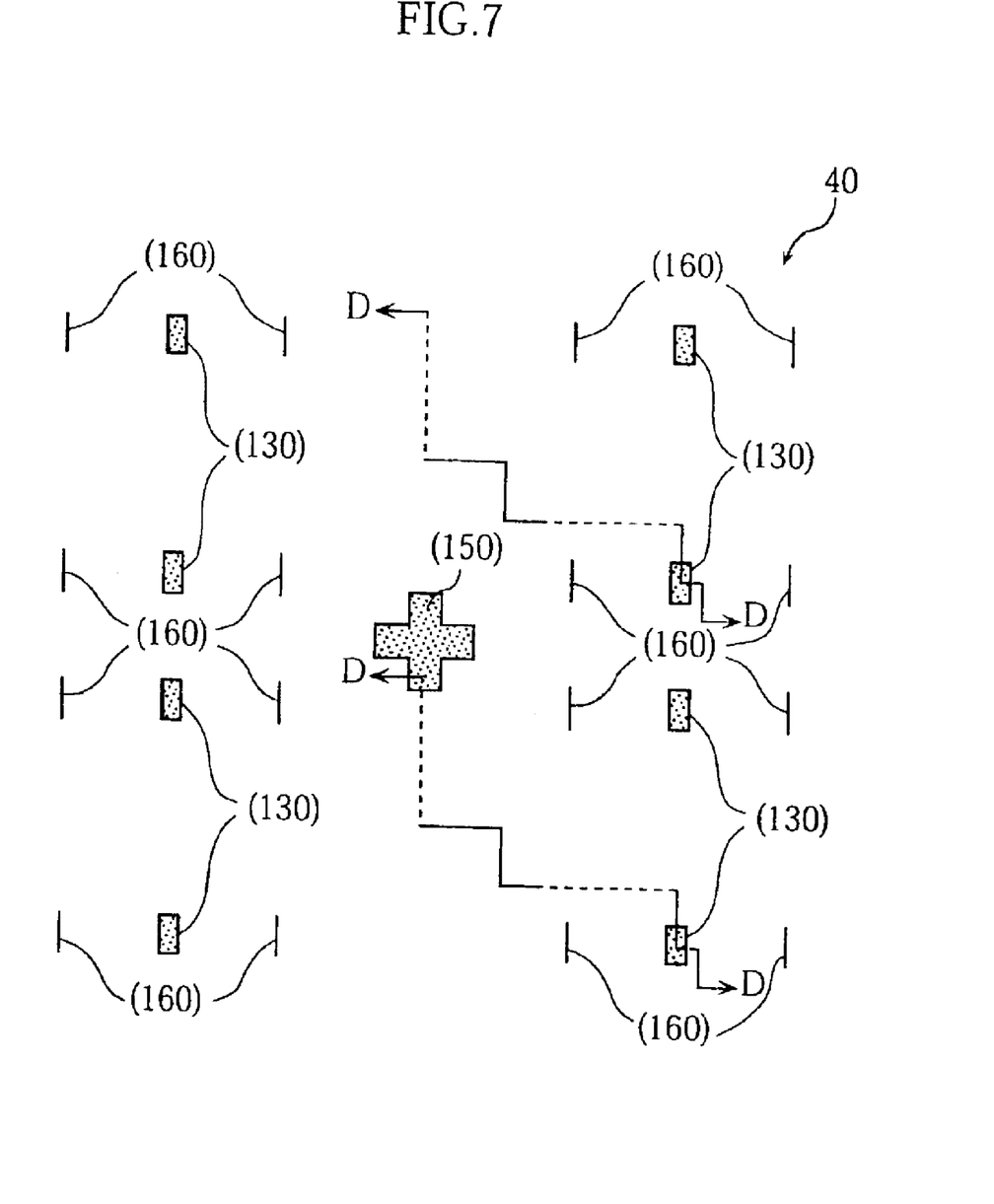
FIG. 7 shows a second mask used for the method of the present invention.

Then, a photoresist layer (whose thickness may range from 0.5 $\mu$m to 50 $\mu$m) is formed on the SOI wafer 101' by thermal oxidation or CVD to produce a second etching mask. (In place of the photoresist layer, an Si$_3$N$_4$ layer may be grown.) The photoresist layer is then subject to an etching process to form a second mask pattern 30 shown in FIG. 4E. This etching process is performed with the use of a second mask 40 shown in FIG. 7. The second mask 40 is configured so as to provide the torsion bars 130, a reinforcing part 150 and support beams 160. In place of the photo-etching process, wet etching or dry etching may be employed. In either case, the first mask pattern 10 should not be etched away.

As shown in FIG. 1, the cross-shaped reinforcing part 150 is located at a point where four corners of four micromirror chips 100 are close to each other. The reinforcing part 150 connects the four corners of the respective chips 100. These corners are liable to break due to stress concentration as the micromirror chips 100 are being divided into individual products. The reinforcing part 150 protects the fragile corners from such damage. After the division of the micromirror chips 100 is properly performed, the reinforcing part 150 is removed. The support beams 160 bridge between the mirror portion 110 and the frame 120. In this manner, the beams 160 prevent the mechanical stress caused by the fabrication process from concentrating only on the torsion bars. After fulfilling the role, the support beams 160 are removed.

Then, though not shown in the figures, the SOI wafer 101' is provisionally fixed to a circular supporting base with the use of a sticky substance such as photoresist or grease. The provisional fixing substance should be a good thermal conductor (so that heat can be effectively conducted from the circular supporting base to the wafer 101' during a dry etching process) and produce no or a very limited amount of objective gas in a vacuumed and heated condition during the dry etching process. The diameter of the circular supporting base may be 15.24 cm (6 inches).

Figure 4F:
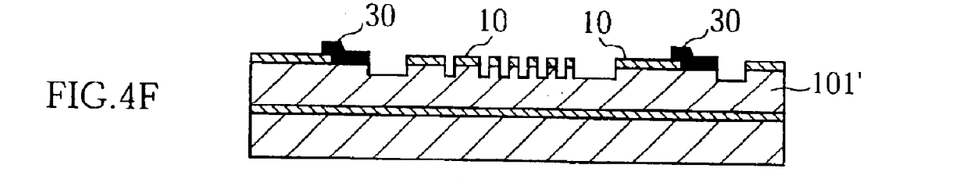

Then, as shown in FIG. 4F, the first etching is performed with respect to the wafer 101' in the presence of the first and the second mask patterns 10, 30. A preferable etching technique may be DRIE (Deep Reactive Ion Etching) utilizing $SF_6$ gas and $C_4F_8$ gas. The etching is continued until a prescribed depth (e.g., 5 $\mu$m) is reached. Instead of the DRIE, a wet etching technique may be employed utilizing a solution of KOH, for example.

Figure 4G:
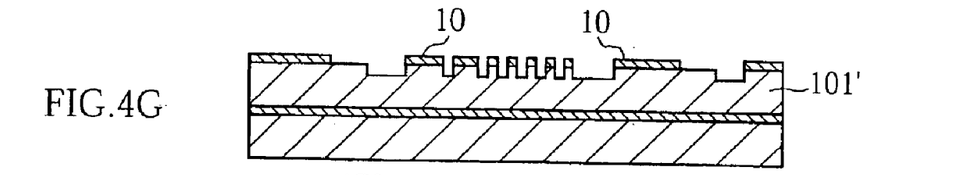

Then, as shown in FIG. 4G, only the second mask pattern 30 is removed by exposure to an organic solvent or oxygen plasma. The organic solvent should react with the material from which the second mask pattern 30 is formed, but not with the material of the first mask pattern 10 so that no part (or substantially no part) of the first pattern 10 is etched away.

Figure 4H:
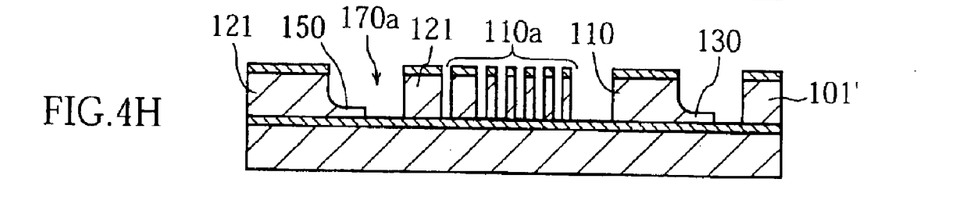

Then, as shown in FIG. 4H, the second etching process is performed in the presence of the first mask pattern 10 only. In the illustrated embodiment, the second etching is DRIE with the use of $SF_6$ gas and $C_4F_8$ gas. The etching process is continued until a prescribed depth of 95 $\mu$m (measured from the wafer surface) is reached.

The above-described steps produce the requisite parts above the intermediate insulator 140 which correspond to the mirror portion 110, the first comb-like electrodes 110a–110b, the primary frame part 121, the torsion bars 130 and the support beams 160. Together with these parts, the separation space 100a, the reinforcing parts 150 and division grooves 170a are also produced. It should be noted that the first mask 20 (FIG. 6) is used for making not only the mirror portion 110, the comb-like electrodes 110a–110b and the primary frame part 121, but also the separation space 100a and the division grooves 170a. This simultaneous or parallel formation eliminates the need to use an extra mask for forming the division grooves 170a, which raises the efficiency of the etching process. Likewise, the second mask 40 (FIG. 7) is used for making the torsion bars 130 and the support beams 160 as well as the reinforcing part 150. Thus, there is no need to prepare an extra mask for making the reinforcing part 150. Preferably, each division groove 170a is formed to extend in a direction slanting to the crystal axis of the silicon substrate. In this way, it is possible to prevent a break in the substrate from becoming larger along the division groove 170a.

Figure 5A:
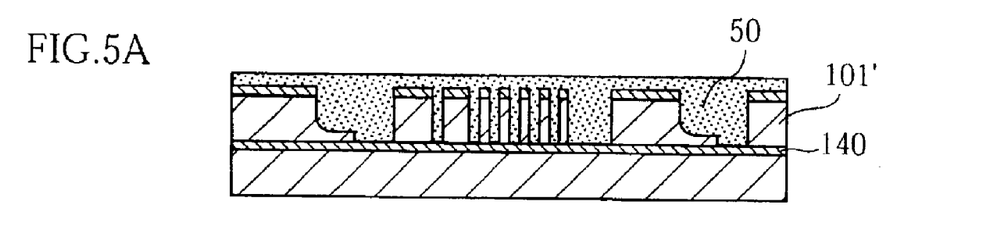

After the etching process shown in FIG. 4H is over, the SOI wafer 101' is detached from the unillustrated circular base. Then, as shown in FIG. 5A, a grease 50 is applied to the etched side of the wafer 101'. After overturned, the wafer 101' is provisionally attached to the circular base again. Advantageously, the grease 50 serves as provisional adhesive and as a protector of the etched region of the wafer 101'.

Figure 5B:
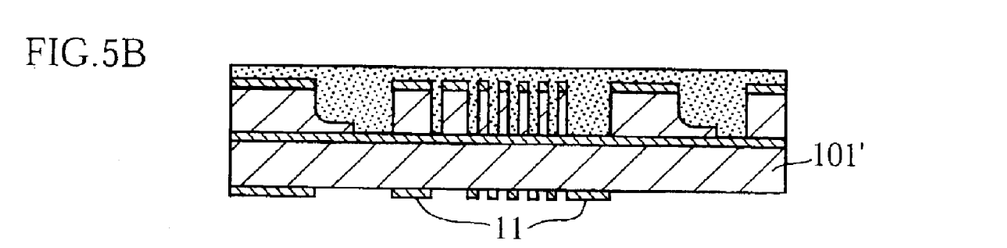
Figure 8:
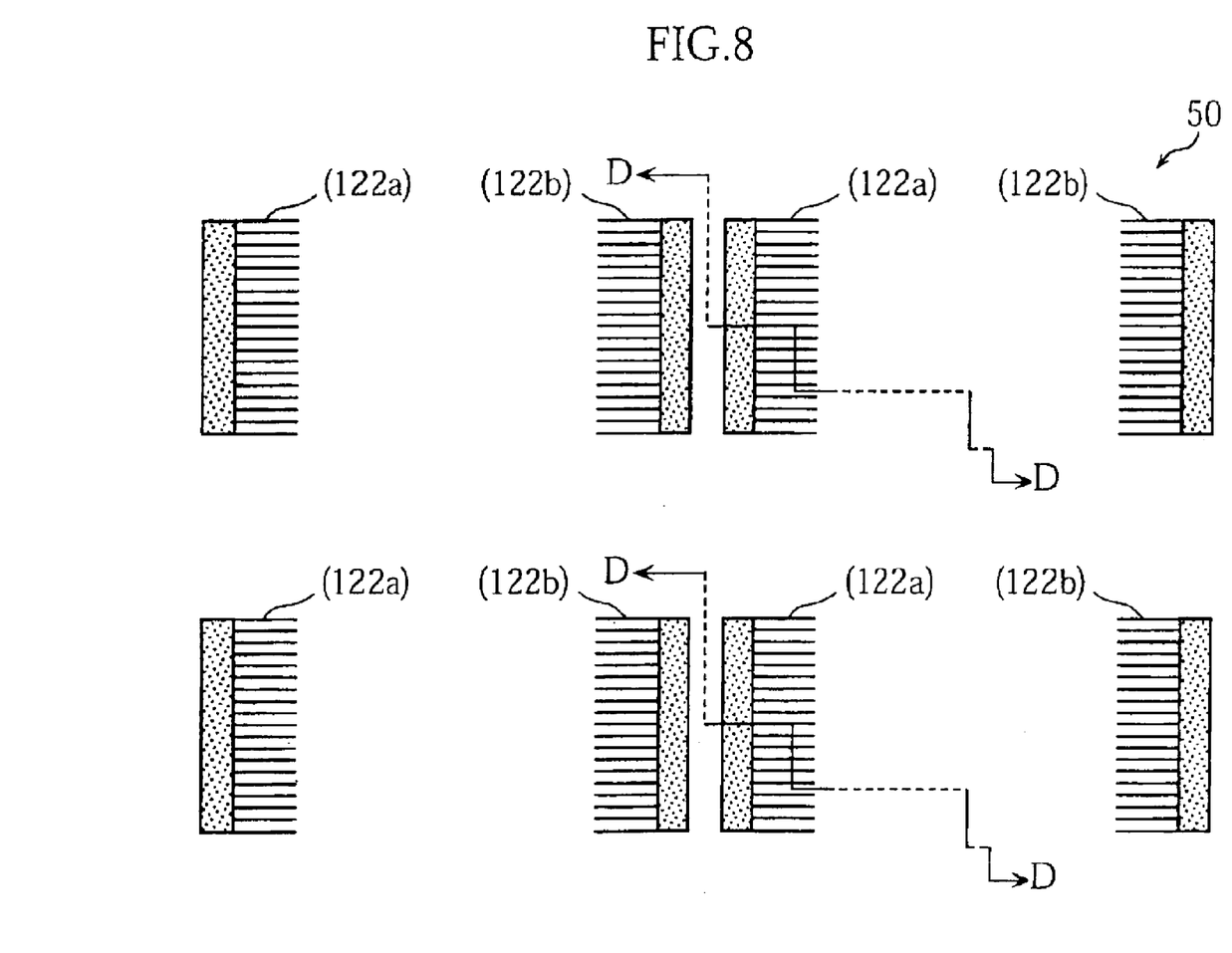
FIG. 8 shows a third mask used for the method of the present invention.

Then, in the substantially same manner as described with reference to FIGS. 4A–4H, the lower side of the wafer 101' will be processed. Specifically, as shown in FIG. 5B, a third mask pattern 11 is formed on the wafer 101' by patterning a silicon dioxide layer (having a thickness of 100 nm–1000 nm, for example). The etching of the $SiO_2$ layer is performed with the use of a third mask 50 shown in FIG. 8. The third mask 50 is so configured that the electrode bases 122 and the second comb-like electrodes 122a, 122b will be obtained.

Figure 5C:
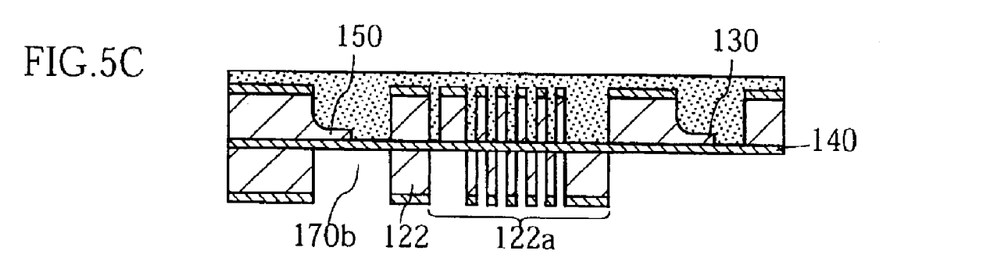

In the presence of the third mask pattern 11, the wafer 101' is subjected to an etching process. The etching technique to be employed may be DRIE utilizing $SF_6$ gas and $C_4F_8$ gas. The etching is continued until a predetermined depth of 100 $\mu$m (measured from the wafer surface) is reached. As a result, the structure shown in FIG. 5C is obtained.

Through the above-described steps, the wafer 101' is formed with portions corresponding to the electrode bases 122, the second comb-like electrodes 122a–122b and the division grooves 170b. According to the preferred embodiment, the division grooves 170b can be formed in making the desired structure of the micromirror chip 100. At this time, the wafer 101' is gradually reduced in thickness at the site where each division groove 170b is formed. However, the corners of each four micromirror chips 100 are connected by a reinforcing part 150 (as shown in FIG. 1). Thus, no break will occur which would otherwise begin to grow from those corners of the chips 100.

Figure 5D:
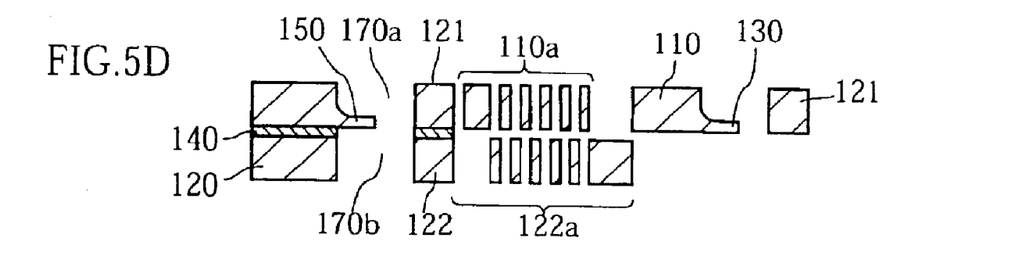

Then, as seen from FIG. 5D, the grease 50, the first mask pattern 10, the third mask pattern 11 and the prescribed parts of the intermediate insulator 140 are removed by wet etching, for example. Further, the reinforcing part 150 and the support beams 160 are also removed, to provide the end product micromirror chip 100. The removal of the reinforcing part 150 and the beams 160 may be performed by blowing with the use of laser or joule heating, for example. The reinforcing part 150 may be removed by a mechanical cutter.

The mirror layer 111 on the mirror portion 110 may be formed before the above-described procedures are performed. In the above embodiment, both the upper and the lower sides of the SOI substrate are subjected to etching. According to the present invention, only one side of an Si substrate may be subjected to etching.

In the above embodiment, the reinforcing part 150 and the torsion bars 130 are simultaneously formed to the same thickness. When different thicknesses are required for these members, more than one mask may be prepared and these masks may be removed at different stages during an etching process.

As described above, the reinforcing part 150 prevents the growth of a break at the adjacent corners of the micromirror chips 100 (see FIG. 1). The same advantage can be enjoyed by arrangements shown in FIGS. 9–11B.

Figure 9:
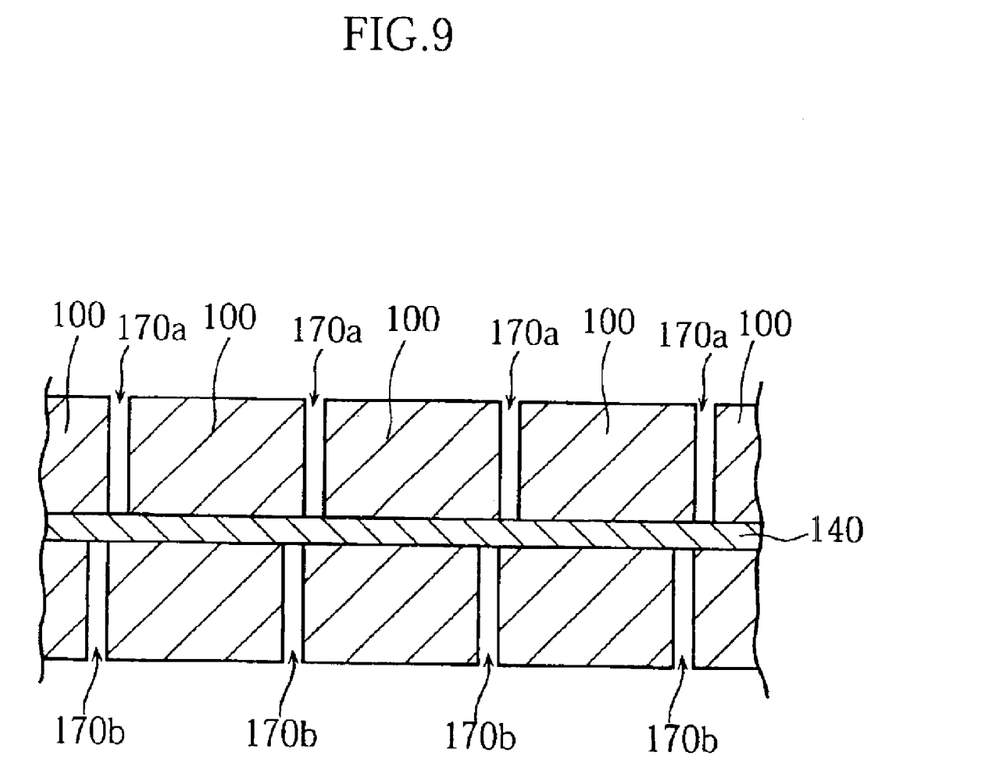
FIG. 9 is a sectional view showing a possible arrangement of division grooves formed in accordance with the present invention.

Specifically, referring to FIG. 9, the SOI wafer is formed with upper division grooves 170a and lower division grooves 170b which are slightly offset from the upper ones in a direction parallel to the intermediate insulator 140.

Since the intermediate insulator 140 is present within the wafer, no objectionable break will be made in the wafer during the formation of the division grooves 170a, 170b. At a final stage, the intermediate insulator 140 is subjected to etching to permit the upper and the lower division grooves 170a, 170b to communicate with each other. Thus, the dividing of the micromirror chips 100 into separate products can be performed properly.

Figure 10A:
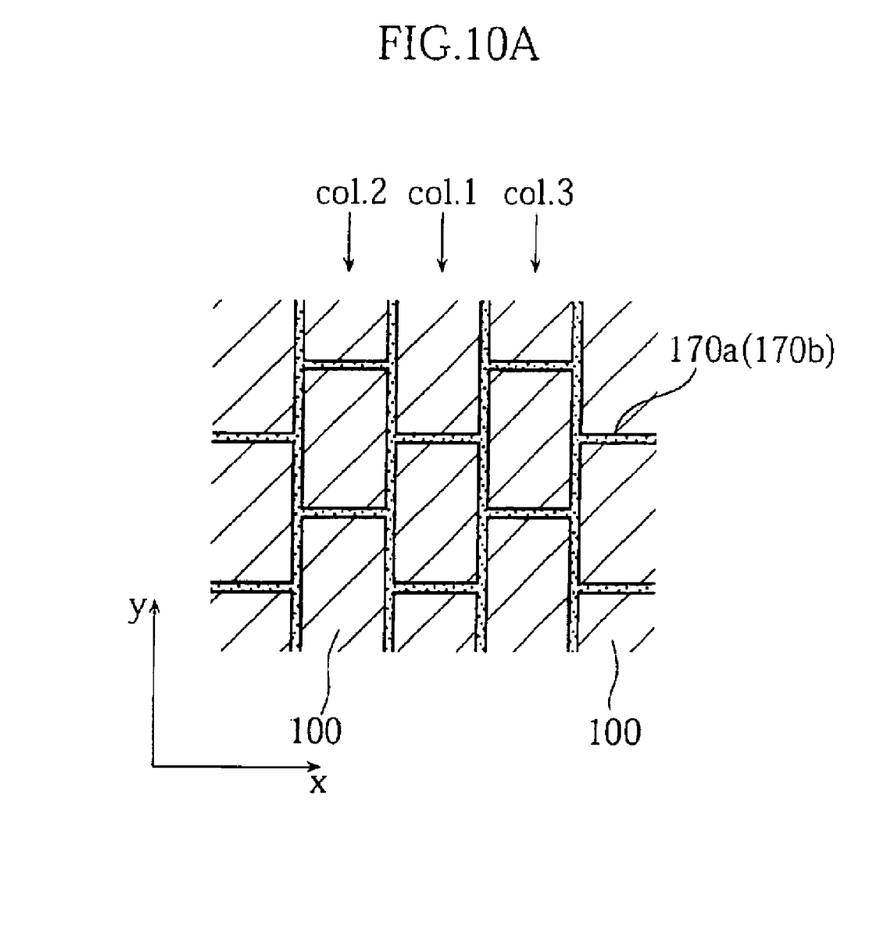
Figure 10B:
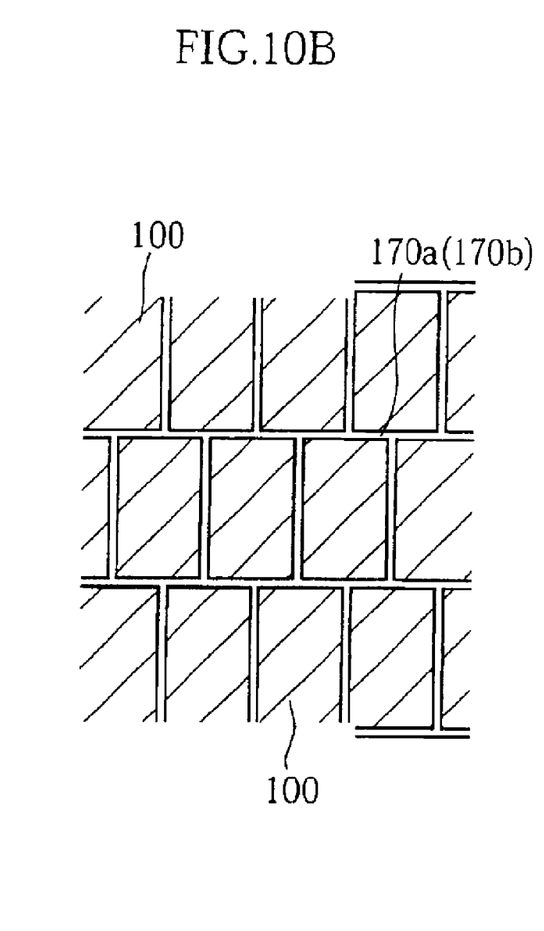

According to an arrangement shown in FIG. 10A, the division grooves extending in the y-direction, or longitudinal direction of the substrate, pass by several micromirror chips 100 without terminating in midstream. On the other hand, the division grooves extending in the x-direction (which is perpendicular to the y-direction) are divided into segments that terminate at the intersections with the longitudinal grooves. As shown in the figure, the segments in column 1 (col.1), for example, are offset in the y-direction from the segments in the adjacent columns 2 and 3. This segmented arrangement of particular division grooves is advantageous to preventing unrestricted growth of a break that could otherwise occur along the particular groove. FIG. 10B shows a groove arrangement similar to that shown in FIG. 10A, except that the lateral division grooves are made to extend continuously, the longitudinal division grooves being cut into segments.

Figure 11A:
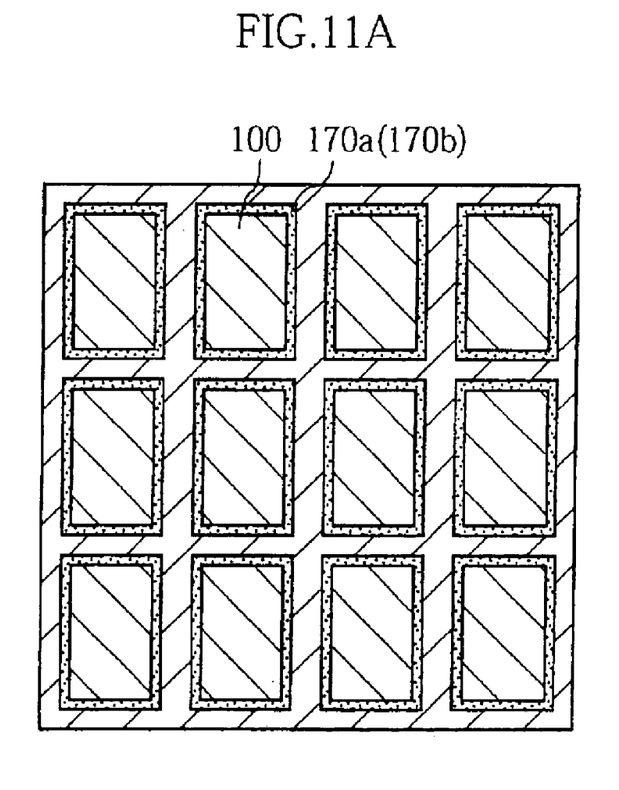
Figure 11B:
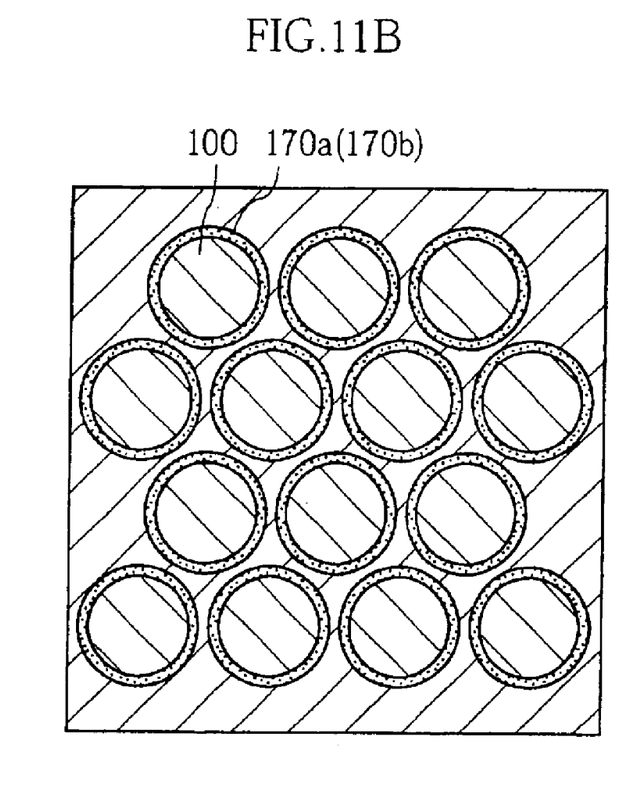

FIGS. 11A and 11B show a plurality of independent division grooves (forming closed loops) each of which surrounds one of the micromirror chips 100. In the example of FIG. 11A, each division groove is rectangular, while in the example of FIG. 11B, each division groove is circular. In either case, the substrate-forming material is present between the adjacent division grooves, which is advantageous to preventing the growth of a break caused in the substrate.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A method of making a plurality of micromirror chips collectively from a common substrate, each of the micromirror chips including a micromirror unit that includes a frame, a mirror-forming portion separate from the frame via spaces, and a torsion bar connecting the mirror-forming portion to the frame, the method comprising: etching the common substrate to form said spaces; and etching the common substrate to form division grooves for dividing the common substrate into said plurality of micromirror chips, wherein the etching for formation of said spaces is performed in parallel with the etching for formation of the division grooves.

2. The method according to claim 1, wherein a reinforcing part connecting corners of micromirror chips is formed during the etching for formation of the division grooves, the reinforcing part being produced by leaving part of the common substrate unetched.

3. The method according to claim 2, wherein the reinforcing part is formed in parallel with the torsion bar.

4. The method according to claim 1, wherein the division grooves comprise a first groove and a second groove terminating at a point on the first groove.

5. The method according to claim 1, wherein the division grooves comprise closed loops separate from each other, each of the closed loops enclosing a corresponding one of the micromirror chips.

6. The method according to claim 5, wherein each of the closed loops extends to be rectangular or circular.

7. The method according to claim 1, wherein the common substrate comprises a composite plate including a first electroconductive layer, a second electroconductive layer and an intermediate insulating layer sandwiched by these electroconductive layers, and wherein the division grooves and said spaces are formed in both the first and the second electroconductive layers.

8. The method according to claim 7, wherein the division groove formed in the first electroconductive layer is offset from the division groove formed in the second electroconductive layer.

9. The method according to claim 1, wherein the division grooves extend to slant relative to a crystal axis of the common substrate.

10. A method of making a plurality of device chips collectively from a common substrate, the method comprising: etching performed in a structure building process of the device chips; etching performed to form division grooves for dividing the common substrate into individual device chips; and forming a reinforcing part in the division grooves for connecting corners of the device chips;

wherein the etching in the structure building process of the device chips is performed in parallel with the etching to form the division grooves, and wherein the reinforcing part is formed by leaving part of the common substrate unetched.

* * * * *